(12) United States Patent
Chen et al.

(10) Patent No.: US 6,921,521 B2
(45) Date of Patent: Jul. 26, 2005

(54) METHOD OF PRODUCING CHLORINE DIOXIDE EMPLOYS ALKALINE CHLORATE IN A MINERAL ACID MEDIUM AND UREA AS A REDUCING AGENT

(75) Inventors: TianLang Chen, Sichuan (CN); YaoPing Wu, Sichuan (CN); ShenXiu Xiao, Sichuan (CN)

(73) Assignee: Steven Yichuan Chen, Plainsboro, NJ (US)

( * ) Notice: Subject to any disclaimer, the term of this patent is extended or adjusted under 35 U.S.C. 154(b) by 0 days.

(21) Appl. No.: 10/686,691

(22) Filed: Oct. 15, 2003

(65) Prior Publication Data

US 2004/0131534 A1 Jul. 8, 2004

(51) Int. Cl.$^7$ .......................... C01B 11/02; C05D 1/00; C05C 9/00
(52) U.S. Cl. .......................... 423/478; 423/479; 71/35; 71/51
(58) Field of Search .................. 423/477, 478, 423/479; 71/35, 33, 34, 49, 50, 51

(56) References Cited

U.S. PATENT DOCUMENTS

| | | | |
|---|---|---|---|
| 3,764,663 A | * | 10/1973 | Sims et al. .................. 423/478 |
| 5,273,733 A | | 12/1993 | Winters et al. |
| 5,324,497 A | * | 6/1994 | Westerlund .................. 423/478 |
| 5,545,389 A | | 8/1996 | Winters et al. |

* cited by examiner

Primary Examiner—Ngoc-Yen Nguyen
(74) Attorney, Agent, or Firm—Fox Rothchild, LLP

(57) ABSTRACT

A method of producing chlorine dioxide ($ClO_2$) is described which employs Urea as a reducing agent to reduce alkaline chlorate ($NaClO_3$ or $KClO_3$) in a mineral acid medium. The method of the invention can, for example, by means of a very high transfer rate, be used to reduce over 90% of the reactant, alkaline chlorate, to the product, chlorine dioxide. Furthermore, $ClO_2$ product purity is accomplished, for example, over 95%. The mother solution of the reaction can then be processed, for example, to produce other useful inorganic salts, including potassium sulfate, potassium nitrate, sodium nitrate, and the like, and/or compound fertilizer resulting in useful chemical products rather than toxic waste. Accordingly, the method of the invention provides for efficient, cost effective, and safe production of $ClO_2$ as well as inorganic salts and/or compound fertilizer.

15 Claims, 1 Drawing Sheet

METHOD OF PRODUCING CHLORINE DIOXIDE EMPLOYS ALKALINE CHLORATE IN A MINERAL ACID MEDIUM AND UREA AS A REDUCING AGENT

Priority of invention is claimed under 35 USC § 119 from The People's Republic of China Patent Application No. 02133934.1, entitled "A Method of Preparing Chlorine Dioxide and Co-Producing Inorganic Salt and/or Compound Fertilizer Simultaneously", filed on Oct. 21, 2002 (herein incorporated by reference).

FIELD OF THE INVENTION

The invention described herein pertains to the field of manufacturing chlorine dioxide ($ClO_2$).

BACKGROUND OF THE INVENTION

Chlorine dioxide is a highly effective and safe oxidant for sterilization, deodorization, bleaching, and, for example, antistaling. Particularly, $ClO_2$ is widely used in the food processing industry, water treatment, wood pulp manufacturing and processing, and the medical/health care industry. Very importantly, for example, chlorine dioxide is widely acknowledged to be the best and most desirable, disinfectant for water. Chlorine dioxide is listed as a Grade A1 safe disinfectant by the World Health Organization (WHO), due to its effectiveness, non-carcinogenicity and non-toxicity. Moreover, particularly in view of the physiological need of humans for safe water, as well as other materials, combined with the increasing global threat of bio-terrorism, the need for safe and efficient methods $ClO_2$ production has now increased significantly.

An electrochemical method and two chemical methods are currently employed in the manufacturing industry to produce $ClO_2$. The electrochemical method, i.e., Electrolytic Method, requires high capital equipment investments as well as demands high operating cost. Accordingly, very large plants are normally required to employ it. The applied Chemical methods in the industry are Chemical Oxidation and Chemical Reduction methods. The Chemical Oxidation method normally uses alkaline chlorite (mostly sodium chlorite $NaClO_2$) as raw material. The Chemical Reduction method normally uses chlorate (mostly sodium chlorate $NaClO_3$ or potassium chlorate $KClO_3$) as raw materials. Since chlorate is much less expensive than chlorite, chlorate is used more widely as raw material. Between chlorate, sodium chlorate ($NaClO_3$) is used more widely than potassium chlorate ($KClO_3$) since $NaClO_3$ is less expensive. Traditional reducers used in the Chemical Reduction method are $SO_2$, $Na_2SO_3$, $H_2O_2$, NaCl, HCl, methanol, methanoic acid, oxalic acid, hydrazine sulfate and saccharose. Sodium chlorate ($NaClO_3$) is generally employed as the raw material. $H_2SO_4$ or HCl are the most common mediums for the reaction. HCl and NaCl, for example, commonly employed as reducers, render the total amount of $ClO_2$ and $Cl_2$ produced as product, about 67% $ClO_2$ and 33% $Cl_2$. As a result, subsequent re-purification processes are then needed to enhance the purity of $ClO_2$. In addition, the by-products are normally $Na_2SO_4$, $NaHSO_4$ or NaCl. Many plants discharge $Na_2SO_4$ and $NaHSO_4$ as waste materials, except for possible use as pulp treatment at some paper mills. Other traditional reducers, such as $H_2O_2$, oxalic acid, methanol, $SO_2$ and saccharose are capable of producing $ClO_2$ of high purity with little $Cl_2$, but they are more expensive and difficult to employ, requiring a more complex and risky chemical process.

The invention overcomes many drawbacks of the traditional Chemical Reduction method by using a stable new reducer in a safer new chemical process. The key feature of this invention is to use Urea as the reducing agent to produce high purity $ClO_2$.

SUMMARY OF THE INVENTION

The present invention is directed to methods of producing chlorine dioxide ($ClO_2$), comprising reducing alkaline chlorate in a reaction with urea as reducing agent in a mineral acid medium to produce $ClO_2$. Preferred methods of the present invention employ $NaClO_3$ or $KClO_3$ as alkaline chlorate and the mineral acid employed is selected from the group consisting essentially of sulfuric acid, nitric acid, phosphoric acid and hydrochloric acid. In addition, the current invention is directed to $ClO_2$ produced by methods described herein. The invention is further directed to methods of producing chlorine dioxide ($ClO_2$) and at least one inorganic salt, comprising reducing alkaline chlorate in a reaction with urea as a reducing agent in a mineral acid medium to produce $ClO_2$; then, adding an alcohol as salting out reagent to the reaction mother solution; and, collecting an inorganic salt. Further the invention is directed to methods of producing chlorine dioxide ($ClO_2$) and at least one binary/ternary compound fertilizer, comprising reducing alkaline chlorate in a reaction with urea as reducing agent in a mineral acid medium to produce $ClO_2$; then, adding urea (or other nitrogenous fertilizer), phosphorus ore powder/phosphate fertilizer (amount based on the acid concentration of mother solution), and/or kali salt to the reaction mother solution; and, collecting a compound fertilizer.

DETAILED DESCRIPTION OF THE INVENTION

Figure 1:
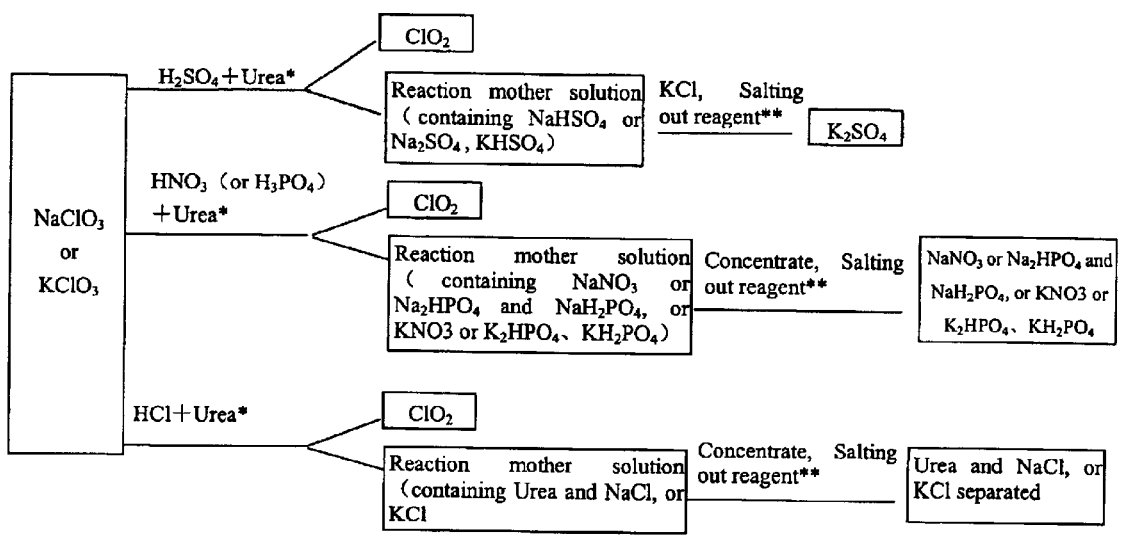
FIG. 1 shows an example flowchart indicating steps of methods of the present invention for the preparing chlorine dioxide and co-producing inorganic salt.

Unless defined otherwise, all technical and scientific terms used herein have the same meaning as is commonly understood by one of skill in the art to which this invention belongs. All publications and patents referred to herein are incorporated by reference.

A method of producing chlorine dioxide ($ClO_2$) is described which employs Urea as a reducing agent to reduce alkaline chlorate such as $NaClO_3$ or $KClO_3$ in a mineral acid medium. But any other chlorate or chloric acid can also be used as raw materials. If chloric acid is used, there is no need for mineral acid medium. The method may be used, for example, to jointly produce inorganic salts and/or compound fertilizer. Methods of the present invention employ chlorate as raw material, mineral acids as a reaction medium, and Urea as a reducing agent. This is different from U.S. Pat. Nos. 5,273,733 and 5,545,389, in which $H_2O_2$ is used as reducing agent while a small amount of urea is used only as a stabilizer.

The method enables efficient production of $ClO_2$ by controlling the mol ratio of chlorate and mineral acid between about 0.2 to about 0.8; acid concentration of the reaction systems between about 3 to about 10 $mol \cdot L^{-1}$ (between about 3 to about 8 $mol \cdot L^{-1}$ is preferred); mol ratio of alkaline chlorate and Urea is between about 2 to about 4 (however, in hydrochloric acid medium, Urea must be increased by about 4 to about 8 times to avoid $Cl_2$ production.); and the reaction temperature between about 40° C. to about 90° C. (between about 55° C. to about 85° C. is preferred) under normal pressure or below atmospheric pressure which is preferable for the run fast of $ClO_2$. About 100 to about 400 mmHg are preferred. In producing $ClO_2$, the catalyst is not necessary although catalyst such as silver, manganese, vanadium, molybdenum, palladium and platinum can also be added if appropriate. After producing $ClO_2$, the reaction mother solution can be concentrated to produce inorganic salts by adding alcohol salting out reagent, or alternatively can be concentrated to produce binary/ternary compound fertilizer with the expected NPK (nitrogen, phosphorus and potassium) nutrient standards by adding Urea (or other nitrogenous fertilizer), phosphorus ore powder/phosphate fertilizer (amount based on the acid concentration of mother solution), and/or kali salt.

The chlorine dioxide production is run in a conventional manner. The reactants can be added continuously to reactor and the production can be continuously performed. It is particularly preferable to paper mills and water works.

Methods of the present invention enable the transfer of chlorate to $ClO_2$ as high as over 90%. The purity of $ClO_2$ produced is as high as over 95%, much higher than that from the traditional reducers processes of HCl and NaCl.

As example, the following reaction equations can illustrate these results:

$$6NaClO_3+Urea+3H_2SO_4=6ClO_2+3Na_2SO_4+N_2+CO_2+5H_2O$$

$$6NaClO_3+Urea+6H_2SO_4=6ClO_2+6NaHSO_4+N_2+CO_2+5H_2O$$

$$6HClO_3+Urea=6ClO_2+N_2+CO_2+5H_2O$$

After thorough reaction, the reaction mother solution can be concentrated to produce inorganic salts by adding an alcohol as salting out reagent at a temperature between about 15° C. to about 25° C. (room temperature). The yield rate of inorganic salt is over 90% with purity over 90% (purity can be further improved by re-crystallization). After producing inorganic salts, the reaction mother solution can be recycled to produce $ClO_2$ again.

Alternatively, the mother reaction solution can also be concentrated to produce binary/ternary compound fertilizer with the expected NPK (nitrogen, phosphorus and potassium) nutrient standards by adding Urea (or other nitrogenous fertilizer), phosphorus ore powder/phosphate fertilizer (amount based on the acid concentration of mother solution), and/or kali salt. This procedure can be employed with or without producing inorganic salts in the first place.

Chlorate as used herein refers to sodium chlorate ($NaClO_3$) and/or potassium chlorate ($KClO_3$). $KClO_3$ is preferred in that $KClO_3$ produces more valuable inorganic salts. Mineral acids can be sulfuric acid, nitric acid, phosphoric acid and hydrochloric acid. Urea is used as reducing agent. Alcohol salting out reagent can be methanol, ethanol, propanol and other alcohols. Ethanol is preferred due to its price and safety features.

In comparison with many existing Chemical Reduction method, methods of the present invention have the following advantages:

1. Currently available methods wherein NaCl or HCl are employed as reducers normally produce a mix of 67% $ClO_2$ and 33% $Cl_2$. In contrast, methods of the current invention can produce $ClO_2$ with purity as high as over 95%. Prior methods moreover require subsequent re-purification processes in order to provide $ClO_2$ free of $Cl_2$. Methods of the present invention, however, normally do not require re-purification prior to use of $ClO_2$ produced thereby.

2. In contrast to expensive reducing agents previously employed such as $H_2O_2$, oxalic acid, methanol, $SO_2$ and saccharose, Urea is inexpensive, non-toxic and easily obtainable. The chemical properties of Urea are very stable and provide less risk of combustion or explosion during the process of the present invention. A particular advantage of reaction processes of the present invention is that there is little risk of explosion normally caused by high concentration/density of $ClO_2$ in the reaction system, because this invention's reaction system simultaneously produces a great deal of water vapor, carbon dioxide and nitrogen, thus lowering the concentration/density of $ClO_2$ in the system.

3. The present invention requires few equipment modifications from the existing process. Almost all known types of reactors can be used e.g. SVP.RTM. Reactors or Mathieson reactors. The production of $ClO_2$ can be continuously performed, so it is particularly preferable to paper mills and water works.

4. Furthermore, Urea as a reducing agent enables subsequent processes much easier to produce inorganic salts and/or compound fertilizer.

5. Jointly producing inorganic salts and/or compound fertilizer by means of methods of the present invention can eliminate most waste materials in the traditional process. As a result of methods described herein the production of $ClO_2$ becomes a clean and environmental friendly process.

6. Jointly producing inorganic salts and/or compound fertilizer processes greatly reduces the production cost of $ClO_2$. Traditional methods with $NaClO_3$ as raw material and $H_2SO_4$ as reaction medium will normally result in by-products of sodium sulfate or sodium bisulfate, both of which have little use and have to be disposed of properly. The method of the invention can convert them into potassium sulfate that can be used as fertilizer. If using nitric acid or phosphoric acid as a reaction medium, the method of the invention can directly produce by-products such as sodium nitrate, sodium biphosphate and sodium hydrogen phosphate, all of which are widely used chemical products. If using $KClO_3$ as raw material and sulfuric acid, nitric acid, or phosphoric acid as reaction medium, the method of the invention will directly produce highly pure and useful inorganic salts such as potassium sulfate, potassium nitrate and potassium biphosphate.

EXAMPLES

Examples of Process Described Herein

The examples as described infra are carried out in laboratory. Pilot-scale production may have modifications; however, the basic scheme of this invention will not change.

Example I $NaClO_3$ (3.2 g solubilized in water), $H_2SO_4$ is used as the reaction medium. Urea is added as the reducing agent. $ClO_2$ is produced when the sulfuric acid concentration is 6.4 mol $L^{-1}$; the mol ratio of $NaClO_3$ and Urea is 3; the reaction temperature is 75° C., and mol ratio of $NaClO_3$ and $H_2SO_4$ is 0.48. The transfer rate from $NaClO_3$ to $ClO_2$ is 87.34%. The resulting purity of $ClO_2$ is 96.8%.

Sodium bisulfate ($NaHSO_4$) is left in the reaction mother solution. Based on the volume of $NaHSO_4$, a mol ratio 1:1 of potassium chloride (KCl) is added. The reaction mixture is heated and concentrated (keeping temperature between about 80° C. to about 100° C.). The moment sediment begins to form, stop heating and filtrate quickly. $KHSO_4$ is the main material in the filtrate. About twice the volume of Ethanol is added at room temperature, solid $K_2SO_4$ is separated out quickly by cooling/filtration (confirmed by IR). The yield percentage is over 94% and the purity is 95% (through re-crystallization, the purity can reach over 98%). The reaction mother solution after releasing ethanol can now be recycled for use again, or can be concentrated to produce binary/ternary compound fertilizer with the expected NPK (nitrogen, phosphorus and potassium) nutrient standards by adding Urea (or other nitrogenous fertilizer), phosphorus ore powder/phosphate fertilizer (amount based on the acid concentration of mother solution), and/or kali salt.

Example II $KClO_3$ (10.7 g solubilized in water), $H_2SO_4$ is used as the reaction medium. Urea is used as the reducing agent. $ClO_2$ is produced when the sulfuric acid concentration is 4 mol $L^{-1}$; mol ratio of $KClO_3$ and Urea is 4; the reaction temperature is 85° C., and the mol ratio of $KClO_3$ and $H_2SO_4$ is 0.5. The transfer rate is 96.3% from $NaClO_3$ to $ClO_2$. The resulting purity of $ClO_2$ is 97.0%.

After concentrating the reaction mother solution and adding ethanol (about twice the volume of mother solution), $K_2SO_4$ can be separated out quickly. Filtrate and then solid $K_2SO_4$ is produced (confirmed by IR). The yield percentage is 95% and the purity is 98%. The mother solution after releasing ethanol can now be recycled for use again. Alternatively, the mother solution can be concentrated directly to produce binary/ternary compound fertilizer with the expected NPK (nitrogen, phosphorus and potassium) nutrient standard by adding Urea (or other nitrogenous fertilizer), phosphorus ore powder/phosphate fertilizer (amount based on the acid concentration of mother solution), and/or kali salt.

Example III $KClO_3$ (10.7 g solubilized in water), $HNO_3$ is used as the reaction medium. Urea is added as the reducing agent. $ClO_2$ is produced when $HNO_3$ concentration is 8 mol $L^{-1}$; mol ratio of $KClO_3$ and Urea is 3; the reaction temperature is 85° C., and mol ratio of $KClO_3$ and $HNO_3$ is 0.5. The transfer rate from $NaClO_3$ to $ClO_2$ is 96.5%. The resulting purity of $ClO_2$ is 95.0%.

After concentrating the mother solution and adding ethanol, solid $KNO_3$ is produced directly. The yield percentage is over 90% and the purity is 95% (through re-crystallization, the purity can reach over 98%). Alternatively, the mother solution can be concentrated directly to produce binary/ternary compound fertilizer with the expected NPK (nitrogen, phosphorus and potassium) nutrient standard by adding Urea (or other nitrogenous fertilizer), phosphorus ore powder/phosphate fertilizer (amount based on the acid concentration of mother solution), and/or kali salt.

Example IV $KClO_3$ (3.0 g solubilized in water), $H_3PO_4$ is used as the reaction medium. Urea is added as the reducing agent. $ClO_2$ is produced when the $H_3PO_4$ concentration is 5 mol $L^{-1}$; mol ratio of $KClO_3$ and Urea is 3; the reaction temperature is 85° C., and mol ratio of $KClO_3$ and $H_3PO_4$ is 0.5. The transfer rate from $NaClO_3$ to $ClO_2$ is 96.99%. The resulting purity of $ClO_2$ is 97.0%.

After concentrating mother solution and adding ethanol, solid $KH_2PO_4$ and $K_2HPO_4$ can be produced directly. The yield percentage is over 94% and the purity is over 95%. Alternatively, the mother solution can be concentrated directly to produce binary/ternary compound fertilizer with the expected NPK (nitrogen, phosphorus and potassium) nutrient standard by adding Urea (or other nitrogenous fertilizer), phosphorus ore powder/phosphate fertilizer (amount based on the acid concentration of mother solution), and/or kali salt.

Example V $NaClO_3$ (3.0 g solubilized in water), HCl is used as the reaction medium. Urea is added as the reducing agent. $ClO_2$ is produced when HCl concentration in the reaction system is 6.0 mol $L^{-1}$; mol ratio of $NaClO_3$ and Urea is 0.84 (more Urea is used here to avoid the formation of $Cl_2$); and the reaction temperature is 65° C. The transfer rate of $NaClO_3$ to $ClO_2$ is 90.5%. The resulting purity of $ClO_2$ is 84.33%.

Compared to other example methods of the present invention, the mother solution, after the reaction, contains a larger amount of Urea and NaCl. Urea, however, may be recovered for reuse. NaCl is a common inorganic salt. For their separation, many traditional methods can be used.

Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described compositions and modes for carrying out the invention which are obvious to those skilled in the art or related fields are intended to be within the scope of the following claims.

What is claimed is:

1. A method of producing chlorine dioxide ($ClO_2$), comprising:
   reducing alkaline chlorate in a reaction with urea, as a reducing agent, in a mineral acid medium to produce $ClO_2$ at or below normal atmospheric pressure.

2. A method according to claim 1 wherein the alkaline chlorate is $NaClO_3$ or $KClO_3$.

3. A method according to claim 2 wherein the mineral acid is selected from the group consisting of sulfuric acid, nitric acid, phosphoric acid and hydrochloric acid.

4. A method according to claim 3 wherein below atmospheric pressure is about 100 to about 400 mm Hg.

5. A method according to claim 4 comprising controlling a mol ratio of alkaline chlorate and mineral acid to be between about 02 to about 0.8 in the reaction.

6. A method according to claim 5 comprising controlling a mineral acid concentration of the reaction to be between about 3 mol-$L^{-1}$ to about 10 mol-$L^{-1}$.

7. A method according to claim 6 comprising controlling a mol ratio of alkaline chlorate and urea in the reaction to be between about 2 to about 4, except that in hydrochloric acid medium, the mol ratio is about 0.84.

8. A method according to claim 7 comprising controlling a temperature of the reaction to be between about 40° C. to about 90° C.

9. A method according to claim 8 comprising controlling a temperature of the reaction to be between about 55° C. to about 85° C.

10. A method of producing chlorine dioxide ($ClO_2$) and at least one inorganic salt, comprising: reducing alkaline chlorate in a reaction with urea as reducing agent in a mineral acid medium to produce $ClO_2$; then, adding an alcohol as salting out reagent to the medium; and, collecting an inorganic salt.

11. A method according to claim 10 wherein the alcohol is selected from the group consisting of methanol, ethanol, and propanol.

12. A method according to claim 11 wherein the alkaline chlorate is $NaClO_3$ or $KClO_3$, and the mineral acid is selected from the group consisting of sulfuric acid, nitric acid, phosphoric acid end hydrochloric acid.

13. A method according to claim 12 wherein the inorganic salt is selected from the group consisting of potassium sulfate, potassium nitrate, and sodium nitrate.

14. A method of producing chlorine dioxide ($ClO_2$) and at least one binary/ternary compound fertilizer, comprising: reducing alkaline chlorate in a reaction with urea as a reducing agent in a mineral acid medium to produce $ClO_2$; then adding urea, phosphorus ore powder or phosphate fertilizer, and/or kali salt to the medium; and, collecting a compound fertilizer.

15. A method according to claim 14 wherein the alkaline chlorate is $NaClO_3$ or $KClO_3$ and the mineral acid is selected from the group consisting of sulfuric acid, nitric acid, phosphoric acid and hydrochloric acid.

* * * * *